March 20, 1962  R. B. BENDER  3,026,076
SUPPORT FOR PIPELINE
Filed Oct. 7, 1960

RICHARD B. BENDER
INVENTOR.

BY *Herbert J. Brown*
ATTORNEY

United States Patent Office 3,026,076
Patented Mar. 20, 1962

3,026,076
SUPPORT FOR PIPELINE
Richard B. Bender, Fort Worth, Tex., assignor to Tejas
Plastics Materials Supply Company, Fort Worth, Tex.,
a corporation of Texas
Filed Oct. 7, 1960, Ser. No. 61,127
2 Claims. (Cl. 248—49)

This invention relates to supporting structures for pipelines.

Economic considerations in the construction and operation of a pipeline include cost factors of installation and maintenance which are interdependent in many respects. A small reduction in the wall thickness of a pipeline may effect a substantial saving in the cost of the pipe, but this saving may be completely offset by a corresponding increase in the coating, laying and maintenance of the line. The diameter of a large capacity relatively thin wall pipe may be expanded two or three thousandths of an inch for each three inches of circumference and a corresponding loss in diameter may accompany an operational shutdown. A brittle pipe coating can thus be ruptured and cause the admittance of moisture to the surface of the pipe with consequences of costly corrosion. A cold flowing coating can absorb expansion and contraction of the pipe it covers without permitting the admission of moisture but this type of coating tends to yield and flow away from points where the pipe rests upon edges of stones at the bottom of a ditch in which the pipe is laid; these points of contact are the very places where the coating is needed most and where rupture of the pipe wrap and penetration of the coating is most likely. Where a resilient or flowing pipe coating is used, damaging contact may be made between the pipe and hard supporting members even before the line is laid in the ditch. In some areas where rocky soil is encountered it has been the practice heretofore to provide a rock shield to a coated pipeline in order to protect the coating from damage, but this practice involves the risk of moisture entrapment between the rock shield and coating, and may preclude the use of effective cathodic protection for the pipeline.

Just as the selection of components and materials presents problems of interdependent variables in the construction of a pipeline, so the topography and sub-surface characteristics of an area may dictate variations in procedures for laying pipe. In terrain with suitable soft soil progressive ditching practices may permit this soil to be saved at one side of an excavation line and eventually pushed back into the ditch to form a cushion at the base thereof. In other areas it is impossible to find or save such a cushioning layer and uneconomical to haul such soils into the area. Under the latter circumstance wooden blocks have been used at the base of the ditch to support the pipe at spaced points and to elevate the remainder of the pipe from the base of the rocky ditch so that soil or grannular back fill may work its way under the pipe without sustaining concentrated loads on rocks in the bottom of the ditch. For this use wooden blocks have many failings. Corners and irregularities in the blocks result in detrimental points of concentrated pressure. The rigidity of wood leaves much to be desired as a cushioning material, and the moisture content of wood constitutes a hazard to the pipe and its susceptibility to attack by soil chemicals and fungi which lead to deterioration and loss of support. Sand bags and dirt mounds or benches have been used instead of blocks but were expensive by reason of the hauling and labor involved when laying pipe in rocky areas.

While lengths of pipe in pipelines are usually welded, special problems attend the laying and alignment of bell and spigot joints of cast iron pipe and multiple duct systems of clay or asbestos pipe. In these installations it is often advantageous to prevent the pipe joints from sustaining the weight of the whole line and to provide a clearance between the pipe and the base of the ditch to facilitate sealing operations.

Accordingly, an object of the present invention is to provide ditch base pipe cradles which are strong enough to support and position pipe sections within a ditch but which are at the same time, resilient enough to prevent the formation of points or ridges of concentrated supporting pressure.

Another object of the present invention is to provide pipe cradles which are relatively light and easy to handle and which may be secured to the pipe before it is lowered into the ditch.

Another object of the invention is to provide pipe cradles which are not subject to deterioration from attack by soil bacteria or fungi.

Another object of the invention is to provide pipe supporting members which are not chemically modified by contact with organic or otherwise active soils.

A further object of the invention is to provide pipe cradles having a low rate of moisture penetration and absorption.

A particular object of the invention is to provide a pipe cradle having advantageous dielectric characteristics.

These and other objects will become apparent from the following description and the accompanying drawing, wherein.

Figure 2:
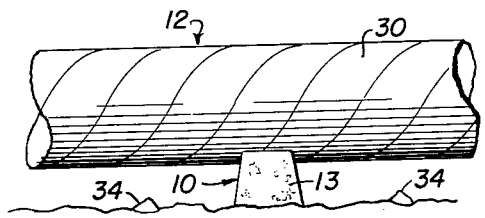
FIGURE 2 is a fragmentary side elevational view of a section of pipe supported by the invention at the base of a ditch.
Figure 3:
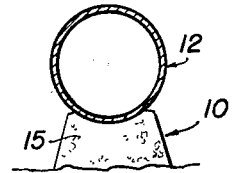
FIGURE 3 is a transverse section and elevational view of the components shown in FIGURE 2.
Figure 4:
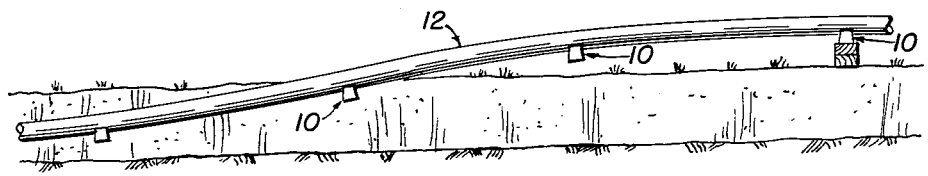
FIGURE 4 is a sub-surface side elevational view illustrating an application and typical use of the invention during construction of a pipeline.
Figure 1:
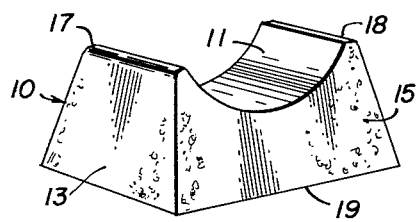
FIGURE 1 is a perspective view of a preferred form of the invention.

In the drawing, and with particular reference to FIGURE 1, a pipe cradle 10 is constructed in the shape of a truncated right rectangular pyramid. The upper surface of the pyramid is arcuate and constitutes a bearing face 11 adapted to receive less than 90° of the circumference of a pipe 12. With respect to the orientation of a pipe section 12 received and supported by the bearing face 11, the distance between lateral sides 13 and 14 of the cradle 10 is greater than the distance between longitudinal sides 15 and 16. Shoulders 17 and 18 form the highest parts of the cradle 10 and are positioned laterally adjacent the bearing face 11. The base 19 of the cradle is rectangular and planar and is disposed parallel with the generating axis of the bearing face 11. The lateral sides 13 and 14 and the longitudinal sides 15 and 16 are upwardly convergent toward a point above the center of the base 19, and the lengths of the shoulders 17 and 18 are consequently less than that of the side lateral sides of the base 19, whereas the distance between the shoulders is less than the lengths of the longitudinal sides of the base.

The cradle 10 is constructed as a uniform mass of unicellular foam such as Dylite, Styrofoam or polyurethane, and is preferably fabricated to support twenty pounds per square inch of bearing surface. Adequate supporting strength may be obtained without detrimental loss of resiliency by fabricating the cradle within a density range of not less than two or more than ten pounds per cubic foot.

The arcuate bearing face 11 provides not only a surface over which the borne weight of a pipe section may be evenly distributed, but also forms an area in contiguous contact with the pipe 12 or outer wrap 30 thereof so that a viscose or pressure sensitive adhesive 31 may be applied to the bearing face and serve as a means of attachment between the cradle 10 and pipe 12.

Figure 5:
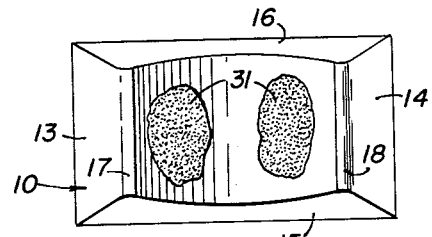
FIGURE 5 is a plan view of the invention illustrating the use of one side adhesive applications therewith.
Figure 6:
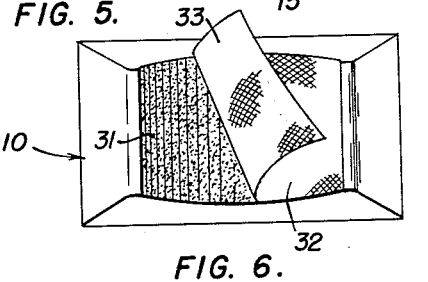
FIGURE 6 is a plan view of the invention showing a preferred method providing an adhesive coating in the cradle.
Figure 7:
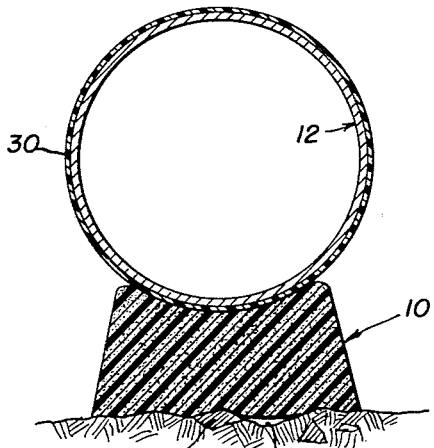
FIGURE 7 is an enlarged sectional and elevational view of the invention and a section of pipe supported thereby.

Alternate systems for applying adhesives 31 to the bearing face 11 are shown in FIGURES 5 and 6; in the former instance cradles may be transported and stored without an adhesive which is subsequently applied by brush to the bearing surface 11 just prior to attachment of the cradle 10 to the pipe 12. The preferred means for utilizing adhesive substances 31 with the cradle 10 is illustrated in FIGURE 6 wherein a pressure sensitive adhesive 31 is applied to the bearing face 11 prior to shipment of the cradles 11 to the field and a strip of paper 32 having a waxed underside 33 is placed over the bearing face 11 to facilitate handling of cradles during shipment and to prevent contamination of the pressure sensitive adhesive 31 by dust. For field installation and use of the invention, pipe sections are welded together beside a ditch having an uncushioned base and coatings and wraps are applied to the pipe in the conventional manner. As the pipe is lowered into the ditch a workman follows the last sling hoist and attaches pipe cradles as described herein to the underside of the pipe at spaced intervals. The adhesive 31 on the bearing face 11 holds the cradle 10 against the pipe 12 until the cradle supports the pipe at the base of the ditch. The dimensions of the base 19 of the cradle 10 relative to the shoulders 17 and 18 and bearing face 11 counteract tendencies of the pipe to overturn the cradle as these two members are slightly shifted about the base of the ditch when subsequent portions of pipe are lowered. The shape of the bearing face 11 and the inherent resiliency of the cradle 10 prevent spots or ridges of weight concentration to form between the two. The weight of the pipe upon the bearing face 11 has a tendency to draw the shoulders 17 and 18 toward one another against the circumference of the pipe 12 or its outer wrap 30 and to further enhance weight distribution on the bearing face 11. Irregularities such as stones 34 or voids 35 at the base of the ditch do not come into bearing contact with the pipe, its coating or its wrap 30 and thereby contact stones which might harm the outer wrap 30.

The invention is not limited to the exemplary construction herein shown and described, but may be made in various ways within the scope of the appended claims.

What is claimed is:

1. A plurality of cradles for a pipeline within a ditch, each said cradle being comprised entirely of a single block of compressible unicellular foam having a substantially flat base and an upwardly directed bearing face conforming to the lower surface of the pipe to be supported, said foam having a density of not less than one pound per cubic foot nor more than 10 pounds per cubic foot, said flat base being compressible to conform with irregularities such as projecting rocks in the bottom of said ditch, yet capable of supporting the pipeline laid thereon above the bottom of the ditch.

2. A plurality of cradles for a pipeline within a ditch as defined in claim 1, and wherein said upwardly directed bearing surface of each said cradle includes a pressure sensitive adhesive coating thereon.

References Cited in the file of this patent

UNITED STATES PATENTS

| | | |
|---|---|---|
| 2,849,027 | Tetyak | Aug. 26, 1958 |
| 2,891,749 | Heverly | June 23, 1959 |

OTHER REFERENCES

Dow Chemical Co. (Styrofoam Technical Data), March 1947.

Koppers Company Inc. "Dylite" (Expandable Polystyrene), 1954.

"British Plastics," pp. 20–23, January 1959.